United States Patent [19]
Strenglein

[11] 3,778,827
[45] Dec. 11, 1973

[54] SHORT RANGE MONOPULSE MARINE SEARCH RADAR FOR SMALL OBJECT DETECTION

[75] Inventor: Harry F. Strenglein, Clearwater, Fla.

[73] Assignee: Sperry Rand Corporation, Great Neck, N.Y.

[22] Filed: Jan. 27, 1972

[21] Appl. No.: 221,277

[52] U.S. Cl. ............................... 343/7.3, 343/16 M
[51] Int. Cl. ........................... G01s 9/16, G01s 9/22
[58] Field of Search ............... 343/16 M, 16 R, 7.3, 343/13 R

[56] References Cited
UNITED STATES PATENTS

| | | | |
|---|---|---|---|
| 3,720,941 | 3/1973 | Ares | 343/16 M |
| 3,141,163 | 7/1964 | Parode et al. | 343/13 |
| 3,262,113 | 7/1966 | Hefter et al. | 343/16 M |
| 3,243,805 | 3/1966 | Smith, Jr. | 343/16 M |

*Primary Examiner*—Benjamin A. Borchelt
*Assistant Examiner*—H. A. Birmiel
*Attorney*—Howard P. Terry

[57] ABSTRACT

The subject invention comprises a short range monopulse marine search radar for detecting small targets such as channel markers in the water. The radar has its antenna directed so that its monopulse null intersects the surface of the water at an initial minimum range proximate the radar over which sea clutter is below the boresight line. This initial range is investigated by very narrow transmitted rf pulses to determine the presence of targets therein. The antenna is subsequently controlled in elevation by a signal coupled through a balanced modulator to the antenna so that the intersection of the monopulse null and the water surface is positioned at successive increased ranges which are investigated by the very narrow transmitted pulses. At each successive range, the geometry provided by the position of the radar antenna and the position of the monopulse null-water surface interface is such that sea clutter is below the boresight line and each successive range segment is increased exponentially by a range gate. When the range gate and the elevation monopulse both interpret the same time as corresponding to the time interval between the firing of the transmitter and the time corresponding to the range to the surface of the water, above-boresight targets in the range segment preceding this interface are interpreted as being other than sea clutter and are displayed on a display device.

11 Claims, 6 Drawing Figures

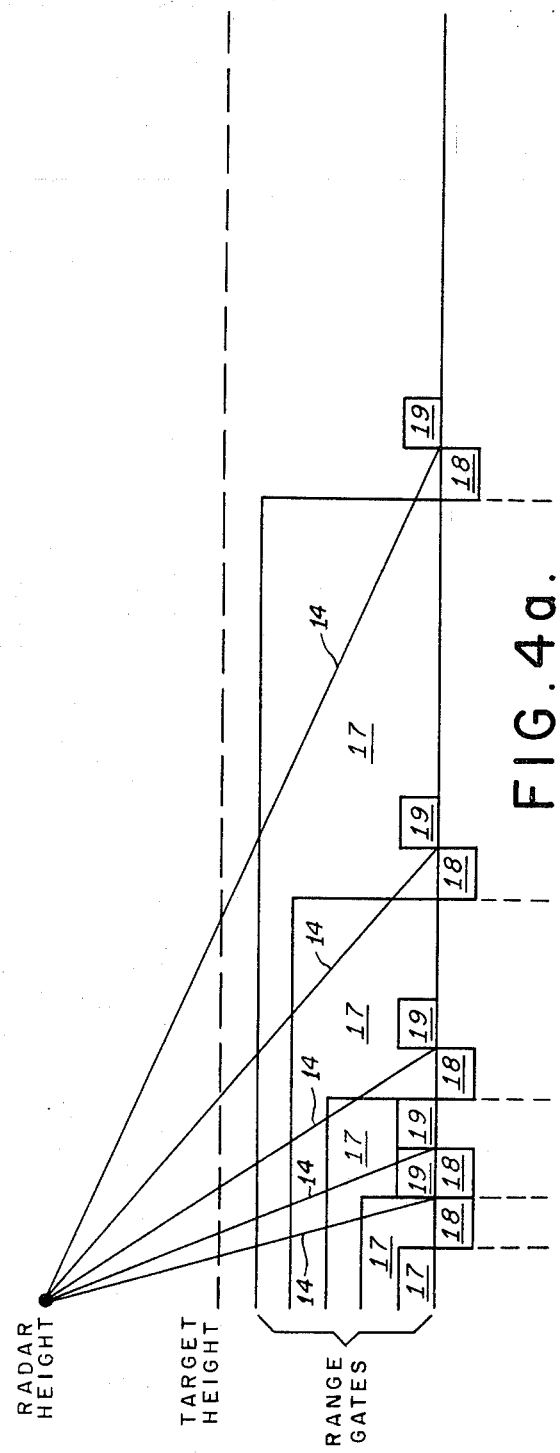
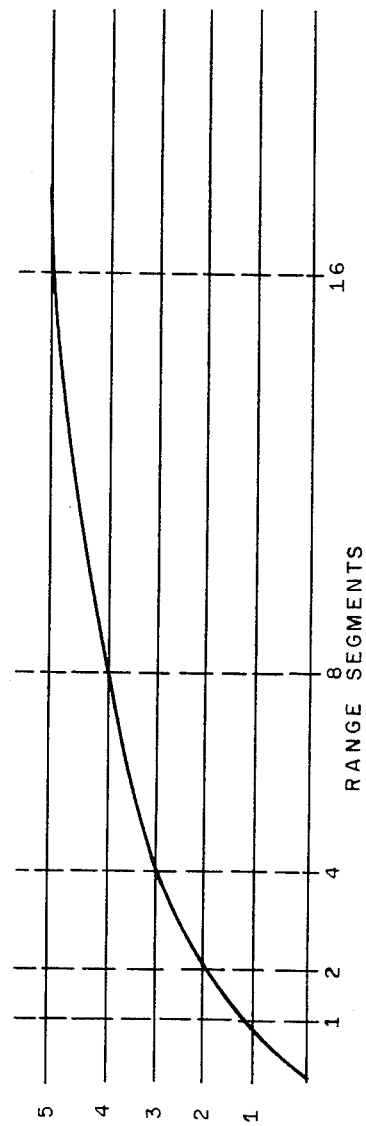

SHORT RANGE MONOPULSE MARINE SEARCH RADAR FOR SMALL OBJECT DETECTION

BACKGROUND OF THE INVENTION

1. Field of the Invention

The invention pertains to the art of marine radar and particularly to a specialized search radar which will permit the detection and ranging of small targets projecting above the water surface at short ranges.

2. Description of the Prior Art

Prior art marine search radars designed to permit the detection and ranging of small targets projecting above the surface of the water at relatively close ranges are subjected to sea clutter. The surface of the water may be considered as composed of a number of individual scatterers and the average echo signal from all the independent scatterers illuminated by a radar is a function of the average radar cross section per unit area, $\sigma^\circ$. At low angles of depression, i.e., the angle the radar boresight makes with the horizon, the value of the average radar cross section per unit, $\sigma^\circ$, is very low. However, the surface area illuminated by a radar beam incident at small angles can be extensive and the result is a large total echo signal due to clutter. Therefore, the performance of prior art marine search radars is adversely effected by the large total echo signal received. As a result a marine search radar which provides improved detection and ranging of small targets such as channel markers at close ranges is needed.

Further, radars which incorporate moving target indicator (MTI) techniques do not provide a satisfactory solution to the adverse effects of the large total echo signal because both the vessel and the targets are moving, hence a reference is lacking. The subject invention is a monopulse radar which has been adapted by the addition of processing circuits which perform logic functions that minimize the effect of the large total echo signal due to sea clutter received at low angles of depression thereby improving the performance of the radar and permitting detection and ranging of small targets at close ranges.

SUMMARY OF THE INVENTION

The subject invention is incorporated in a monopulse radar having conventional azimuth sweep circuitry which functions in a manner well known in the art. The radar includes a transmitter, a circulator, a monopulse antenna, a sum and difference network, mixers, a local oscillator, range and elevation I.F. amplifiers and a phase sensitive demodulator. A balanced modulator which is coupled between the output terminal of the range I.F. amplifier and the difference input terminal of the phase sensitive demodulator applies a portion of the sum network power at either zero degrees or 180° phase to the phase sensitive demodulator. The balanced modulator is also responsive to a sampled output of an early-late gate generator and produces a control signal which permits limited steering of the radar antenna.

The control signal from the balanced modulator steers the antenna in elevation until the monopulse null-water surface interface is time coincident with the occurrence of early-late gates produced by the early-late gate generator. Coincidence is indicated when the video difference output from the phase sensitive demodulator is below a preset threshold in a voltage comparator. The output signals from the voltage comparator are coupled to a three-input AND gate along with output range gates and the difference video signals from the phase sensitive demodulator. When there is coincidence between the three input signals to the AND gate, the difference video signals are coupled to a display unit.

The range between the radar and the monopulse null-water surface intersection is a range in which the sea clutter is below the boresight line of the radar. Therefore, this range is investigated with very narrow transmitted rf pulses to determine the presence of targets which extend above the boresight line. Initially, at ranges close to the radar, relatively small targets can be detected only in a limited range immediately preceding the monopulse null-water surface interface. However, as the scan range is increased, the range preceding the monopulse null-water surface interface over which relatively small targets can be detected is increased. As a result, the duration of the range gate is increased exponentially thereby increasing the efficiency of the range gating feature of the radar while simultaneously limiting the amount of sea clutter coupled to the display thus enhancing the detection and ranging of small targets.

BRIEF DESCRIPTION OF THE DRAWINGS

FIG. 4a is a graphical representation of the exponential output of the range gate generator.

FIG. 4b is a drawing of the exponentially increasing range gate versus a specified height of target.

DESCRIPTION OF THE PREFERRED EMBODIMENT

Figure 1:
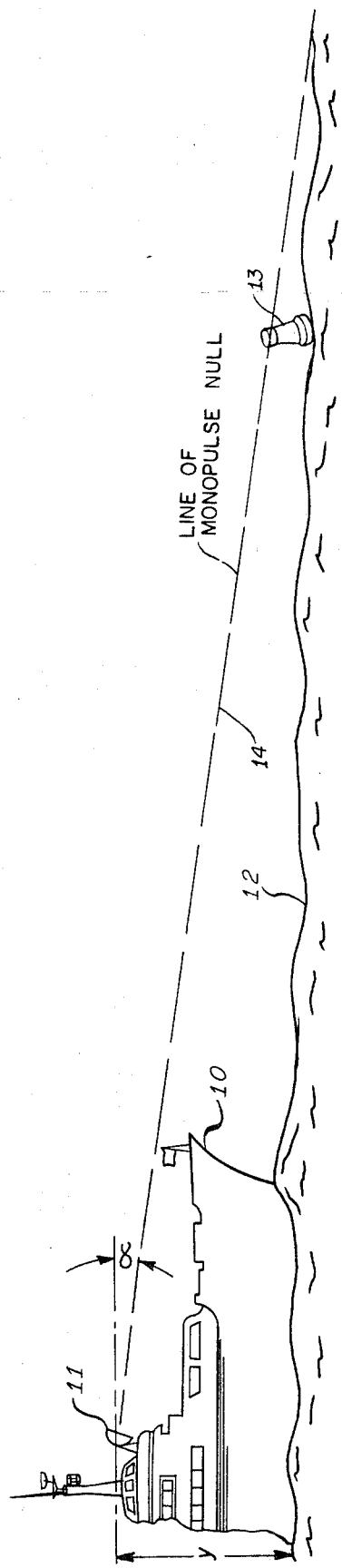
FIG. 1 is a drawing of a vessel mounted radar detecting a small target projecting above a water surface.
Figure 2:
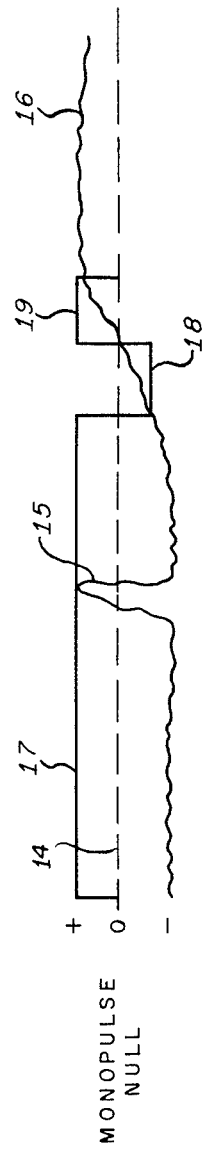
FIG. 2 is a representation of the difference video and clutter provided by a conventional PPI display having superimposed thereon the gates used in the subject invention.

As shown in FIG. 1 a vessel 10 having a monopulse marine radar 11 of a type incorporating the subject invention is located a distance, $y$, above the water and directed toward the surface 12 thereof at an angle, $\alpha$, that is somewhat below the horizon. An object 13 projecting far enough above the surface of the water to cross the monopulse null 14 would appear as shown in FIG. 2 which is a representation of the difference video 15 and clutter 16 provided by a conventional display used with the subject invention. Superimposed on the display in FIG. 2 is the range gate 17, the early gate 18 and the late gate 19.

Although this is a useful display, it is limited in range for any reasonable height of the radar 11 above the water surface 12 and is very sensitive to the pitch and roll motions of the vessel 10. Logic and control circuitry which will be described with reference to FIGS. 3 and 4 enables detection of the object 13 and maintains the sensitivity of the radar 11 during pitch and roll motions of the vessel 10 because the scanning circuits contain no prior assumptions about the initial elevation angle of the object.

Figure 3:
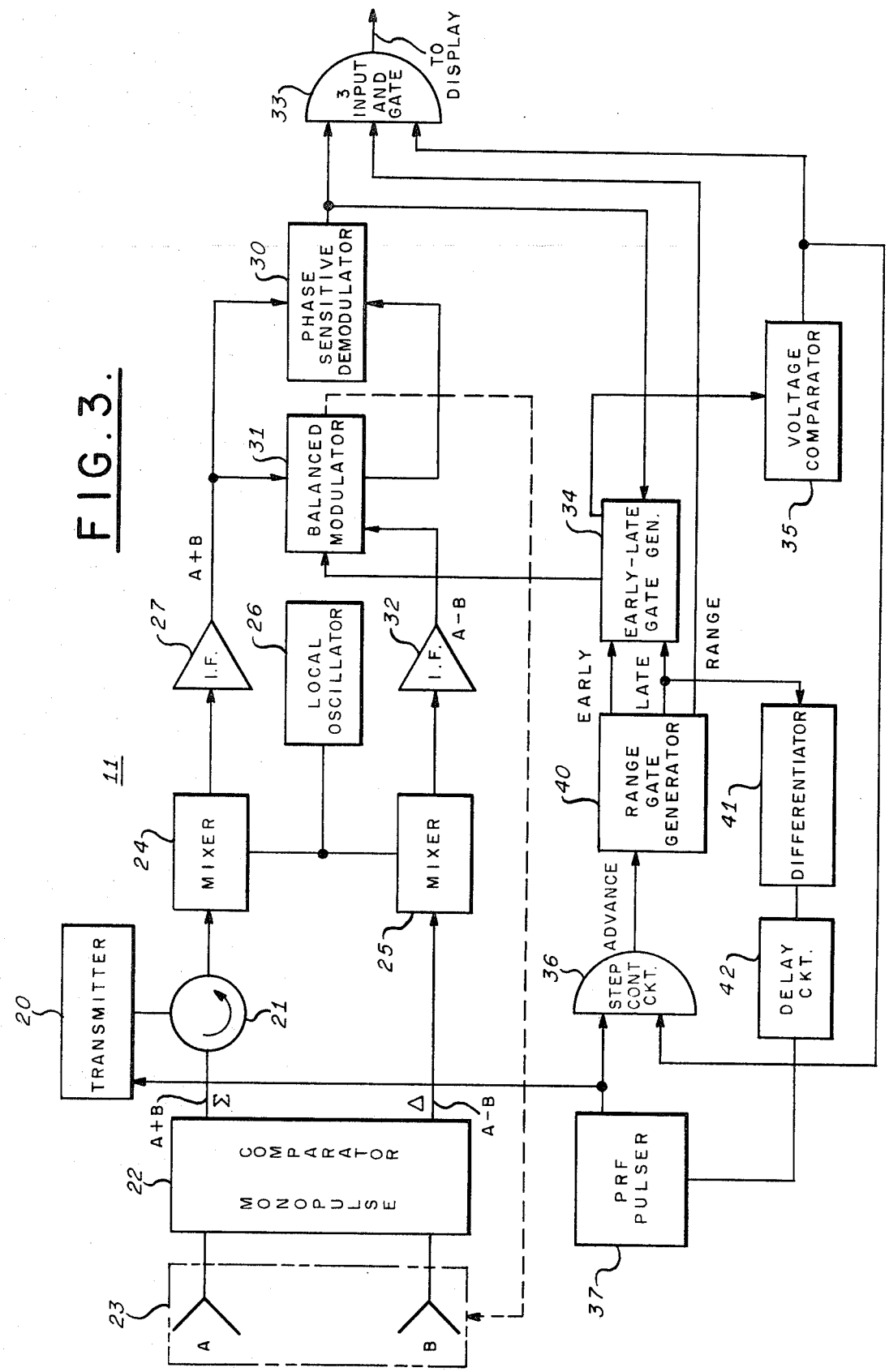
FIG. 3 is a block diagram of the sum and difference channels of a monopulse radar which incorporates the subject invention.

As shown in FIG. 3, the block diagram of a marine radar 11 which incorporates the subject invention, includes a sum channel A + B and a difference channel A−B used in the detection and ranging of small targets in elevation. The radar 11 includes a transmitter 20 which produces a pulse output that is coupled through a circulator 21 and a monopulse comparator 22, which is typically a hybrid junction, to a pair of adjacent feeds A and B in an antenna 23 which are connected to the two arms of the hybrid junction in the monopulse comparator 22. The hybrid junction may be comprised of a "magic T, a rate race or short-slot coupler." The sum channel A + B, couples the sum received energy at the antenna feeds A, B back through the circulator 21 to a mixer 24 while the difference channel, A−B, conducts the difference energy received at the antenna feeds A, B to a second mixer 25. The sum and difference energy are each heterodyned to an intermediate frequency in the mixers 24 and 25 which coact with a local oscillator 26. The intermediate frequency in the sum channel is coupled from the mixer 24 to a range I.F. amplifier 27 which increases the amplitude of the sum signal A + B. The output signal from the range I.F. amplifier 27 is coupled in parallel to a first input on a phase sensitive demodulator 30 and a first input on a balanced modulator 31. The difference signal A − B is amplified in an elevation I.F. amplifier 32 which produces a difference signal of increased amplitude that is applied a second input on the balanced modulator 31 and coupled from the balanced modulator 31 to a second input on the phase sensitive demodulator 30.

The balanced modulator 31 may be an electronically variable attenuator which couples a portion of the sum signal A + B at either zero degrees or 180° phase to the second input of the phase sensitive demodulator 30 thereby permitting a limited steering of the null in the monopulse system.

The phase sensitive demodulator 30 produces an elevation difference video signal and is coupled to an AND gate 33, an early-late gate generator 34 and a voltage comparator circuit 35. The output signal produced by the voltage comparator circuit 35 is coupled to a second input on the input AND gate 33 and an input on a step control 36. The second input on the step control gate 36 is coupled to the output of a PRF pulser 37 which is also coupled to the transmitter 20. The output signal produced by the step control gate 36 is applied to a range gate generator 40 which produces an early gate signal, a late gate signal and a range gate signal. The range gate signal is coupled to a third input on the input AND gate 33. The early gate and the late gate are coupled to the early-late gate generator 34 which provides an output signal that is coupled to the balanced modulator 31 which in turn controls the steering of the antenna 23. The late gate is also coupled through the serial combination of a differentiator 41 and a delay circuit 42 to the PRF pulser 37.

In operation the output video signal produced by the phase sensitive demodulator 30 is coupled to one input of the input AND gate 33 but is not coupled through the AND gate 33 unless it is coincident with the range gate signal produced by the range gate generator 40 and the output signal produced by the voltage comparator circuit 35. The difference video is also coupled to the early-late gate generator 34 where it is sampled by the early and late gates 18 and 19 of FIG. 2. The early and late gates 18 and 19 are adjacent gates which are produced in the range gate generator 40. The early gate 18 occurs at the termination of the range gate 17 0f FIG. 2 and the late gate 19 occurs immediately following the termination of the early gate 18. The difference video sampled by the early gate 18 and late gate 19 produces an error signal which is the output signal that is coupled from the early-late gate generator 34 to the balanced modulator 31 and is utilized to control the steering of the antenna 23 in elevation. Referring to FIG. 2 the monopulse null is zero when the early gate 18 and the late gate 19 sample equal values of sea clutter 16 for a given duration of the range gate 17 as shown.

The difference video produced by the phase sensitive demodulator 30 is further coupled to the voltage comparator 35 where its amplitude is compared to a preset threshold. When the difference video signal is at a level below the preset threshold it indicates the monopulse null-water surface intersection is time coincident with the occurrence of early gate 18 and the late gate 19 as shown in FIG. 2. The voltage comparator 35 provides an output signal that is coupled to the input AND gate 33 and to the step control circuit 36. The voltage comparator output signal coupled to the AND gate 33 allows the difference video signal to be coupled through the AND gate 33 for the duration of the variable length range gate 17. It also places the step control circuit 36 in a condition to allow the next trigger pulse from the PRF pulser 37 to be coupled through the step control circuit 36 to the range gate generator 40.

The late gate signal from the range gate generator 40 is applied to a differentiator circuit 41 which produces a differentiated pulse signal of the tracking or leading edge of the late gate signal that is coupled through the delay circuit 42 and applied to the input of the PRF pulser 37. A PRF trigger pulse is produced at the output of the PRF pulser 37 and applied to the step control circuit 36 and the transmitter 20 which initiates transmission of a very narrow r.f. pulse approximately 10–20 nanoseconds wide and the subsequent timing period in the radar system 11.

Figure 4:
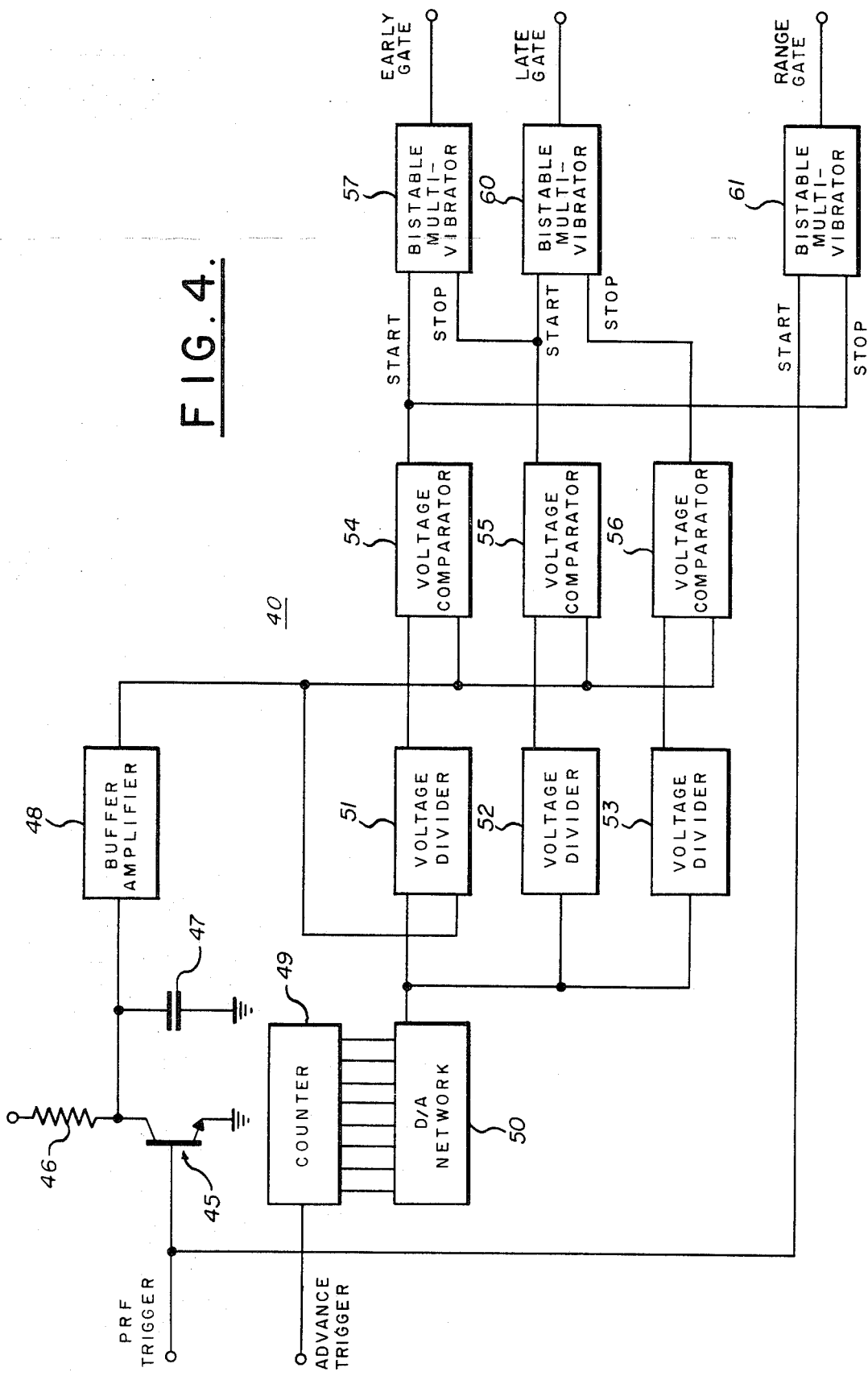
FIG. 4 is a block diagram partially in schematic form of a range gate generator which may be incorporated in the subject invention.

The production of voltage comparator output signals during successive timing periods results in the range gate signal being exponentially increased in duration from a minimum value out to a maximum value. A circuit which may be used to perform the functions of the range gate generator 40 is shown in FIG. 4. The PRF trigger is applied to the base terminal of a transistor 45 which has its emitter coupled to signal ground and its collector coupled to a source of positive voltage through a collector resistor 46. Connected to the junction of the resistor 46 and the collector of the transistor 45 is one terminal of a capacitor 47 and the input of a buffer amplifier 48. The other terminal of the capacitor 47 is connected to signal ground while the output terminal of the buffer amplifier 48 is coupled to a voltage divider 51 and a plurality of voltage comparators. The advance trigger input is applied to a counter 49 which has a plurality of parallel outputs coupled into a digital to analog network 50 which produces an analog output voltage that is applied to voltage dividers 51, 52 and 53 in parallel. The outputs of the parallel connected voltage dividers 51, 52 and 53 are connected to a plurality of associated voltage comparators 54, 55 and 56. The output of the voltage comparator 54 is coupled in parallel to the start input terminal on a bistable multivibrator 57 which provides the early gate signal at its output terminal and the stop input terminal on a bistable multivibrator 61. The output of the voltage comparator 55 is coupled in parallel to the stop input terminal on the bistable multivibrator 57 and the start input terminal on a bistable multivibrator 60. The bistable multivibrator 60 produces the late gate signal at its output terminal.

The PRF trigger is also applied to the start terminal of the bistable multivibrator 61 which provides the range gate signal at its output terminal.

The beginning of each timing period in the monopulse radar 11 is initiated with a PRF trigger which is applied to the bistable multivibrator 61 to produce the leading edge of the range gate signal provided at the output of the bistable multivibrator 61. The PRF trigger which is coupled through the transistor 45 and the buffer amplifier 48 to the voltage divider 51 and the plurality of voltage comparators 54, 55 and 56 will produce output signals from the voltage comparators 54, 55 and 56 at times which are a function of the number of pulses in the counter 49. If no advance trigger pulses are coupled into the counter 49, as for example when the difference video from the phase sensitive demodulator 30 is above the preset threshold of the voltage comparator 35, the counter will contain some predetermined minimum digital number. The digital number will be coupled to the digital to analog network 50 which will provide an analog output voltage proportional to the digital number in the counter 49. The analog output voltage will be scaled proportionally in the voltage dividers 51, 52 and 53 which will in turn provide scaled output voltages that will be applied to the voltage comparators 54, 55 and 56. For the minimum value in the counter 49, output pulses from the voltage comparators 54, 55 and 56 will always occur at the same relative times with respect to the PRF trigger pulse. Therefore, the early gate will be initiated by the pulse output signal from voltage comparator 54 and terminated by the pulse output signal from the comparator 55. The late gate will be initiated by the pulse output signal from the comparator 55 and terminated by the pulse output signal from the comparator 56. The range gate which is initiated by the applied PRF trigger pulse is terminated by the output pulse from the comparator 54. As a result, the early gate is adjacent to the late gate and occurs immediately following the termination of the range gate.

When the difference video signal from the phase sensitive demodulator 30 is greater than the preset threshold in the voltage comparator circuit 35, the early gate, the late gate and the range gate will all occur at the same relative positions with respect to the PRF triggers. However, the early gate and the late gate continue to sample the difference video signal and produce the error signal which is applied to the balanced modulator 31, thereby controlling the steering and elevation of the antenna 23.

When the difference video signal is of a sufficiently low amplitude to enable the voltage comparator 35 to produce an output signal which is coupled to the step control circuit 36, the following PRF trigger is coupled through the step control circuit and applied to the counter 49. The increased digital number in the counter is converted to an analog output voltage in the digital to analog network 50 and applied to the voltage dividers 51, 52 and 53. The increased scaled output voltages from the voltage dividers 51, 52 and 53 are coupled to their associated voltage comparators 54, 55 and 56, respectively in which they are compared with the exponentially increasing output from the buffer amplifier 48. Thus the output signals from the voltage comparators 54, 55 and 56 are exponentially delayed in time with respect to the occurrence of the PRF trigger pulse. As a result, the early gate 18, the late gate 19 and the range gate 17 termination are also exponentially delayed in time with respect to the steps in the digital to analog converter 50 as shown in FIGS. 4a and b.

FIG. 4b shows an exponentially increasing range gate versus a specified height of target. The height of each range gate is shown as a different value for clarity of this representation. In actual practice, the height of each range gate is substantially constant and only the duration is variable. For a given configuration it would be inefficient to use equal range segments, since the range over which a target of a given height fits the detection criteria (projection above the boresight line) increases rapidly as the scan approaches tangency with the water surface. By using an exponential sweep, the successive increments in range are automatically made greater in a nearly complementary manner.

The foregoing process is continued as successive advance trigger pulses are applied to the counter 49 until a maximum value corresponding to the maximum range of the radar 11 is reached at which time the counter is reset to its minimum value.

A 10–20 nanosecond wide transmitted pulse is itself a useful counter to sea clutter because it requires the sea clutter to exceed the target within a pulse width in order to obscure the target. Therefore, having the monopulse null effectively track the surface of the water in exponentially increasing range segments enables the monopulse angle resolution of the radar to convert a fixed target among randomly occurring false targets to a fixed target which is randomly obscured by sea clutter.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A monopulse short-range marine radar for detecting and determining the range to small targets projecting above a water surface comprising transmitter means for providing very narrow pulses of electromagnetic energy, antenna means having one or more pairs of horns, a monopulse null and a bore sight line, said antenna means being coupled to said transmitter means for radiating said very narrow pulses and receiving very narrow return pulses of electromagnetic energy, receiver means coupled to said antenna means for providing sum and difference output signals proportional to the sum and difference of the electromagnetic energy received at said horns, balanced modulator means coupled to said receiver means and responsive to said sum and difference output signals for producing a modified difference signal by coupling a limited amount of said sum output signal to said difference output signal, phase sensitive demodulator means responsive to said sum and modified difference output signals for providing elevation difference video output signals, threshold means coupled to said demodulator means for providing an output signal when said demodulator means produces a difference video signal having an amplitude less than a preset threshold value, trigger pulse means coupled to said transmitter means for producing timing pulses which control the occurrence of said very narrow transmitter pulses, gating pulse means coupled to said demodulator means and said trigger pulse means for providing pulses which produce control signals proportional to sampled values of said difference video output signals, servo control loop means coupled to said modulator means and said antenna means for directing said antenna toward said water surface whereby the position of the monopulse null-water surface interface is time coincident with said occurrence of said sampling pulses as indicated by said demodulator means producing a difference video signal having an amplitude less than said preset threshold value, display means, logic means coupled to said threshold means, said demodulator means, said gating means, and said display means for allowing difference video signals from said demodulator means which occur prior to said sampling pulses to be coupled to said display means thereby producing a visual indication of the presence and the range to small targets which project about said water surface and said bore sight line as provided by said difference video signals.

2. A monopulse short-range marine radar as described in claim 1 in which said transmitter means includes means for providing pulses of electromagnetic energy having a pulse width in the range of 10 to 20 nanoseconds.

3. A monopulse short-range marine radar as described in claim 1 in which said phase sensitive demodulator means includes means for providing a positive output signal when the received electromagnetic energy above the boresight line within a pulse width exceeds the electromagnetic energy below the boresight line and for providing a negative output signal when the received electromagnetic energy below the boresight line within a pulse width exceeds the electromagnetic energy above the boresight line.

4. A monopulse short-range marine radar as described in claim 1 in which said phase sensitive demodulator means includes a phase sensitive detector.

5. A monopulse short-range marine radar as described in claim 1 in which said gating pulse means includes means for providing a range gate pulse and adjacent sampling pulses which sample the difference video output signals received from the interface between said monopulse null and said water surface.

6. A monopulse short-range marine radar as described in claim 5 in which said gating pulse means includes pulse generator means for providing a range gate pulse which has its duration increased exponentially and produces first and second adjacent sampling pulses which occur immediately following the termination of said range gate pulse.

7. A monopulse short-range marine radar as described in claim 6 in which said trigger pulse means further includes a circuit comprising the serial combination of a differentiator, a delay circuit and a PRF pulser, said combination being responsive to said second of said adjacent sampling pulses and produces output PRF pulses which initiate each timing cycle of said radar.

8. A monopulse short-range marine radar as described in claim 5 in which said gating pulse means which includes an integrator, a counter, a digital to analog network, and a plurality of parallel connected voltage dividers, voltage comparators, and bistable multivibrators.

9. A monopulse short-range marine radar as described in claim 1 in which said servo control loop means includes means for converting electrical input signals into mechanical output displacements of said antenna.

10. A monopulse short-range marine radar as described in claim 1 in which said balanced modulator means includes an electronically variable attenuator.

11. A monopulse short-range marine radar as described in claim 1 in which said logic circuit means includes a three input AND gate.

* * * * *